United States Patent [19]

Mackoway et al.

[11] Patent Number: 5,244,066

[45] Date of Patent: Sep. 14, 1993

[54] VEHICLE CONTROL CONSOLE HAVING FINGER TIP CONTROLS

[75] Inventors: John P. Mackoway, Washington; Phillip P. Kartcheske, Chillicothe, both of Ill.

[73] Assignee: Caterpillar Inc., Peoria, Ill.

[21] Appl. No.: 962,535

[22] Filed: Oct. 16, 1992

[51] Int. Cl.⁵ .................. B60K 20/02; G05G 1/00
[52] U.S. Cl. ........................ 192/13 R; 74/471 R; 74/491; 74/523
[58] Field of Search .......... 192/13 R; 74/471 R, 74/473 R, 491, 523, 335; 180/333; 200/61.85; 172/431; 297/411

[56] References Cited

U.S. PATENT DOCUMENTS

| | | | |
|---|---|---|---|
| 4,012,014 | 3/1977 | Marshall | 74/523 X |
| 4,055,230 | 10/1977 | Kestian et al. | 180/333 X |
| 4,200,166 | 4/1980 | Hansen | 74/523 X |
| 4,491,325 | 1/1985 | Bersheim | 74/523 X |
| 4,702,358 | 10/1987 | Mueller et al. | 192/13 R |
| 4,702,520 | 10/1987 | Whisler et al. | 297/417 |
| 4,914,976 | 4/1990 | Wyllie | 74/523 |
| 4,984,847 | 1/1991 | Bedu et al. | 297/411 X |

FOREIGN PATENT DOCUMENTS 2158564 11/1985 United Kingdom ............ 74/471 R
2201758 9/1988 United Kingdom ............ 74/471 R Primary Examiner—Richard M. Lorence
Attorney, Agent, or Firm—J. W. Burrows

[57] ABSTRACT

Control consoles are normally utilized to provide ready access to the operator of the controls necessary to perform the various operating functions of the vehicle. Since vehicles, such as construction vehicles, are traversing rough terrain, it is advantageous to stabilize movement of the hand of the operator relative to the controls of the vehicle. In this subject arrangement a control console assembly is provided and has a handrest located thereon. The handrest is adapted to receive the hand of the operator such that the heel of the operator's hand remains in intimate contact with a raised portion of the handrest. A pair of levers are mounted on the control console assembly adjacent the handrest and operatively actuated by the fingertips of the operator's hand. A rotary knob is oriented on the side of the handrest and operative to be rotated by the thumb of the operator's hand. The various controls for the operating function of the earthworking vehicle is controlled by the fingers of the operator without having to move the heel of his hand from the raised portion of the handrest. This allows the operator to have a more finite and smooth control of the various operating functions of the vehicle even though the his body is being jostled around due to the earthworking vehicle traversing rough terrain.

10 Claims, 3 Drawing Sheets

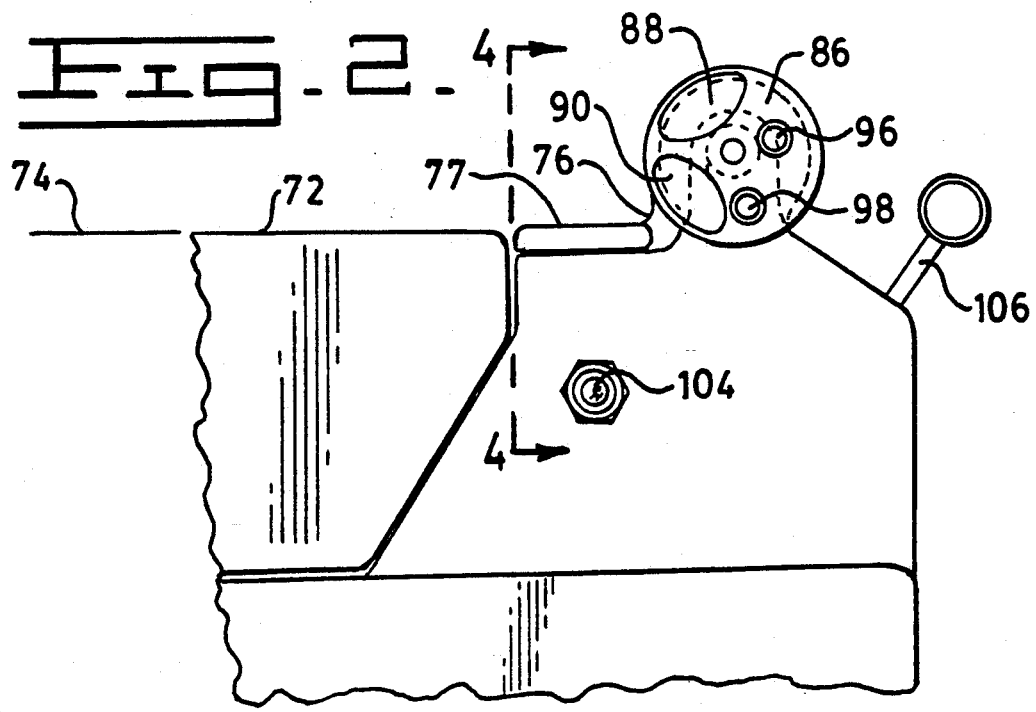
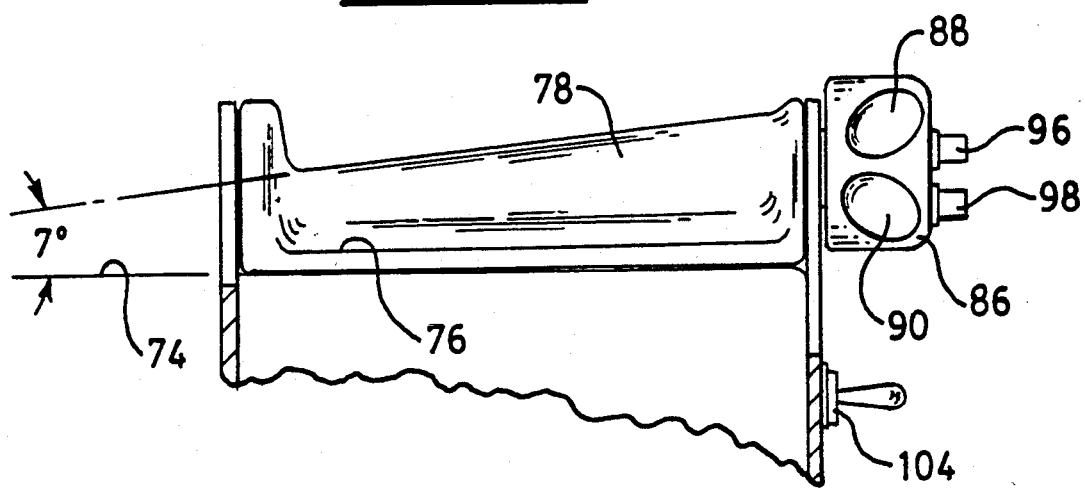

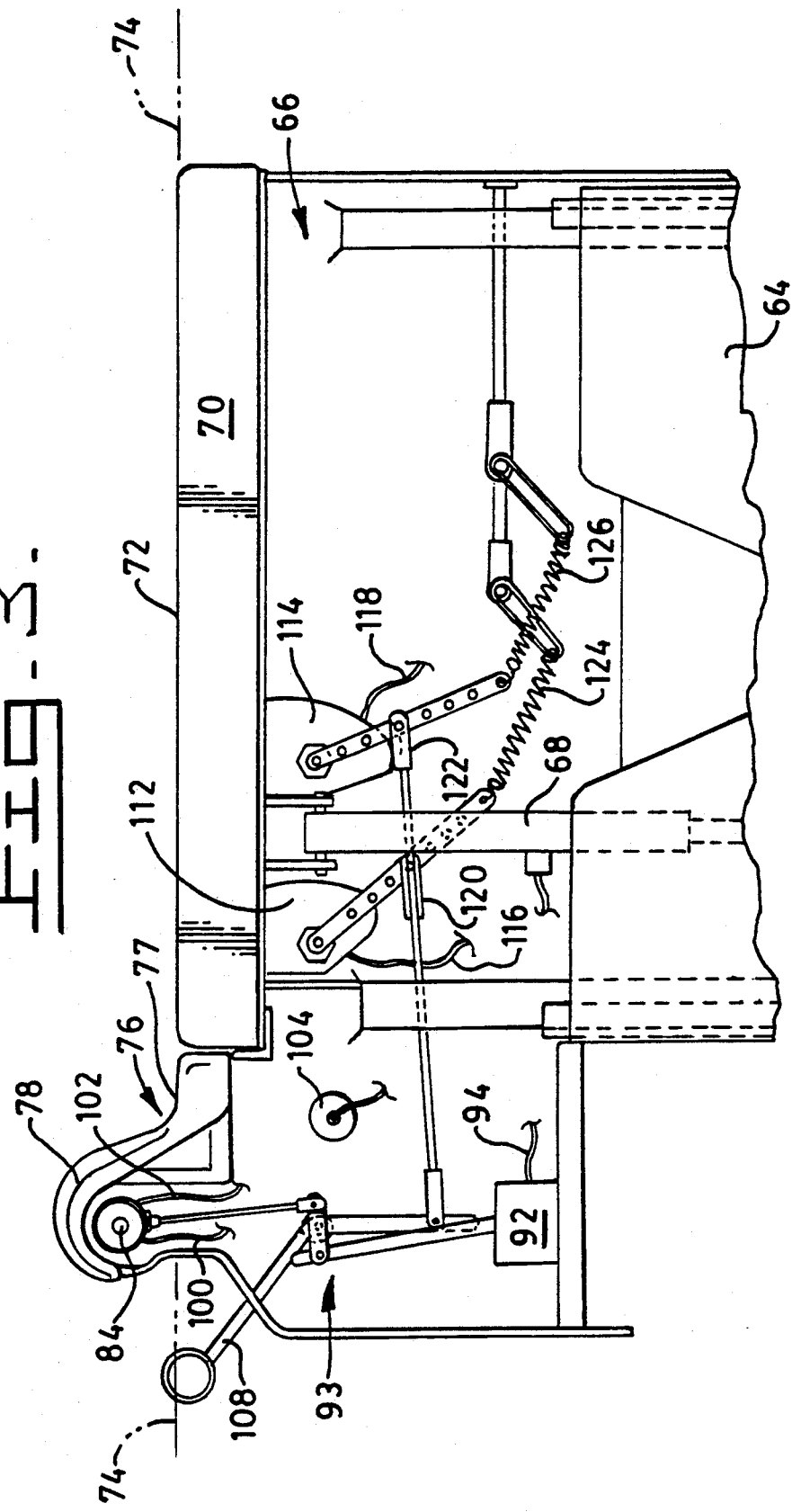

VEHICLE CONTROL CONSOLE HAVING FINGER TIP CONTROLS

TECHNICAL FIELD

This invention relates generally to an earthworking vehicle having a control console with various operating functions and more particularly to a control console assembly and the orientation of the control functions with respect to an operator.

BACKGROUND ART

Various types of control consoles have been available for construction equipment. Many of these control console utilize one or more levers which an operator grasps and moves in order to control the operating functions of the construction vehicle. These levers may be moved fore and aft, sideways or various combinations thereof, such as, a joy stick control which is well known in the art. The known controls are capable of providing precise control of the respective vehicle operating functions. However, due to the jostling of the machine as it traverses over rough terrain, the operator is being likewise jostled within the vehicle. Consequently, since the operator is being jostled around in the vehicle, his arm is likewise being moved with his body which tends to offset precise control of the lever or levers located on the control console. This jostling movement of the operator within the cab of the vehicle is even more pronounced when operating track type vehicles. In one arrangement, a console was provided which allowed the operator to control some of the vehicle's operating functions by the operator's fingers moving electrical switches between an on and off position. Even though the operator's hand was laying on a control console and his fingertips were controlling electrical switches, the operator was not gaining precise control of the operating function. This is true because his hand could still easily move with respect to the control console due to the movement of his body, thus, possibly causing loss of contact of his fingertips with the respective switches.

The present invention is directed to overcoming one or more of the problems as set forth above.

DISCLOSURE OF THE INVENTION

In one aspect of the present invention, a vehicle control mechanism is provided for use by an operator to control an earthworking vehicle which has multiple operating functions. The vehicle control mechanism includes a control console assembly oriented, in use, adjacent one side of the operator. A handrest is provided on the control console assembly and located adjacent the operator. The handrest has a raised portion adapted, in use, for the operator to rest the palm of his hand thereon to provide a firm support for the heel of his hand. A pair of levers is pivotally mounted on the control console assembly and located adjacent the handrest and each of the levers being movable, in use, by any one of the operator's fingertips. A pair of rotary sensors is mounted on the control console assembly and each being operative, in use, to deliver an electrical signal therefrom that is operative to control one of the vehicle's operating functions in response to rotation thereof. Each of the rotary sensors are connected to respective ones of the pair of levers and operative to rotate in response to movement of the respective lever connected thereto.

In another aspect of the present invention, a vehicle control mechanism is provided in combination with a vehicle having a reversible, multi-speed transmission for propelling the vehicle in forward and reverse directions at different speed ratios and a steering control mechanism having steering clutches and brakes for controlling the angle of travel of the vehicle. The steering control mechanism is provided with electrically controlled, proportional valves operative to progressively release the respective steer clutch and to progressively apply the respective steer brake in response to receipt of an electrical signal thereto. The multi-speed transmission is provided with multiple clutches which are selectively engaged in response to an electrical signal to control direction and speed of the vehicle. A microprocessor is provided and connected to the steering mechanism and the multi-speed transmission and is operative to provide the various electrical signals needed to control the steering mechanism and the multi-speed transmission. A control console assembly is provided and oriented, in use, adjacent one side of an operator. A handrest is located thereon and has a raised portion operative, in use, for the operator to have a firm support for the heel of his hand. A pair of levers is pivotally mounted on the control console assembly adjacent the handrest and each lever thereof being operatively connected to respective ones of a pair of rotary sensors. Each of the rotary sensors are operatively connected to the microprocessor to provide a signal thereto responsive to movement by the operator of the respective ones of the pair of levers.

The present invention provides a vehicle control mechanism that allows the operator's hand to be maintained in a steady position even though his body is being jostled within the vehicle from the vehicle being traversed over a rough terrain. Since the operating functions of the vehicle is controlled by the operator's fingertips, a more precise control of the electrical signal inputs to the microprocessor is maintained. Consequently, the control of the vehicle and the vehicle's operating functions are more smoothly maintained.

BRIEF DESCRIPTION OF THE DRAWINGS

FIG. 2 is a partial side view of the vehicle control mechanism of FIG. 1;

FIG. 3 is an opposite side view of the vehicle control mechanism of FIG. 1; and

FIG. 4 is a partial end view of the vehicle control mechanism of FIG. 1.

BEST MODE FOR CARRYING OUT THE INVENTION

Figure 1:
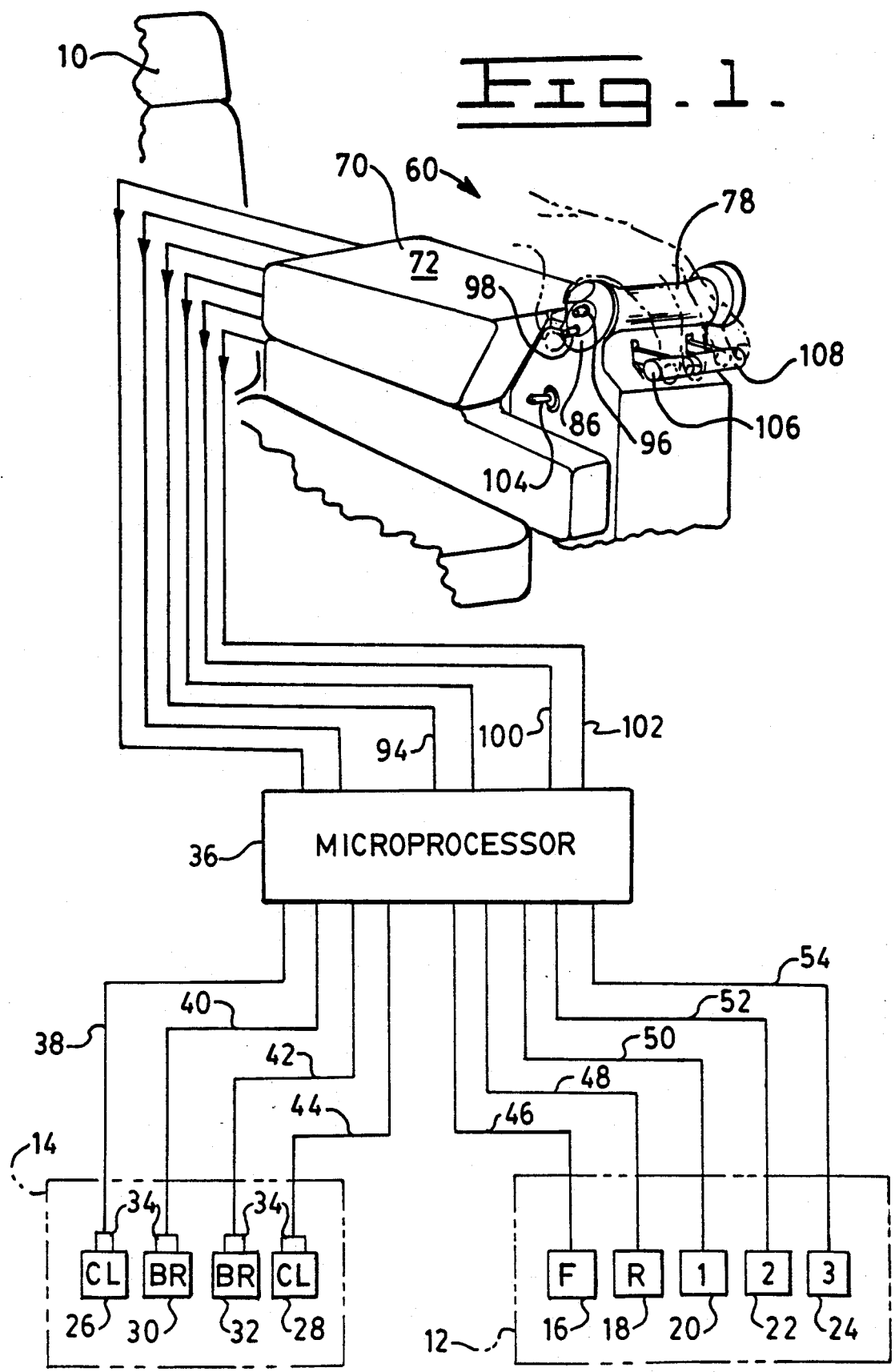
FIG. 1 is a diagrammatic representation of an embodiment of the present invention including a vehicle control mechanism.

Referring to the drawings, a seat 10 of an earthworking vehicle (not shown) is generally diagrammatically illustrated. The earthworking vehicle has various multiple operating functions and includes a reversible multi-speed transmission 12 and a steering control mechanism 14. The reversible multi-speed transmission 12 includes forward and reverse clutches 16,18 and multiple speed ratio clutches 20,22,24. Each of the forward and reverse and speed clutches 16,18 being electrically controlled in response to receipt of an electrical signal. As is well known in the art, the electrical signal is directed to an electro-hydraulic valve mechanism which in turn directs a hydraulic fluid signal to actuate the respective clutches.

The steering control mechanism 14 includes steer clutches 26,28 and brakes 30,32. As is well known in the art, the steer clutches 26,28 are located on opposite sides of the earthworking vehicle to drive, when engaged, the outputs on each side of the earthworking vehicle. Likewise, the steer brakes are located on each side of the vehicle and are operative, when applied, to stop the outputs on each side thereof. Each of the steer clutches 26,28 and brakes 30,32 are actuated by electrically controlled proportional valves 34. Each of the electrically controlled proportional valves 34 are operational to control the respective drive clutches 26,28 and the brakes 30,32 in response to receipt of an electrical signal thereto. By progressively varying the electrical signal provided to the electrically controlled proportional valves 34, the steer clutches 26,28 and/or brakes 30,32 can be progressively activated or deactivated depending on the electrical signal provided thereto. A microprocessor 36 is provided to deliver electrical signals to operate the various operating functions through electrical signal connections 38,40,42,44,46,48,50,52,54.

A vehicle control mechanism 60 is provided and is located on the earthworking vehicle adjacent the operator's seat 10. Even though the vehicle control mechanism 60 is illustrated as being mounted on the vehicle, it is recognized that the vehicle control mechanism 60 could be connected to the operator's seat 10 without departing from the essence of the invention. The vehicle control mechanism 60 includes a frame member 64 and a control console assembly 66 adjustably connected to the frame member 64. An electrically controlled actuator 68 is connected to the frame 64 and the control console assembly 66 and is operative to raise and lower the control console assembly 66 relative to the frame member 64.

The control console assembly 66 has an armrest 70 mounted thereon. The armrest 70 has a top surface 72 oriented generally along a horizontal plane 74 defined thereon. The top surface 72 of the armrest 70 generally lies with the length thereof parallel to the travel path of the earthworking vehicle. However, it is recognized, that the length of the armrest 70 could lie in a line that is not parallel with the path of the earthworking vehicle without departing from the essence of the invention.

A handrest 76 is located on the control console assembly 66 and positioned adjacent the armrest 70 at one end thereof. The handrest 76 has a top surface 77 oriented along the perpendicular plane 74 and a raised portion 78 located thereon. The raised portion 78 of the handrest 76 is oriented above the top surface 72 of the armrest 70 so that the palm of the operator's hand can lay over the handrest 76 and the heel of the operator's hand can be firmly supported against the raised portion. The raised portion 78 of the handrest 76 has an angle of inclination with respect to the horizontal plane 74 in the range of 5 to 9 degrees. As is illustrated in FIG. 4, the angle of inclination is at 7 degrees. Furthermore, the raised portion 78 of the handrest 76 is oriented generally perpendicular to the travel path of the vehicle. However it is recognized, that the position of the raised portion 78 could be at various angles with respect to the travel path of the vehicle without departing from the essence of the invention. The most elevated portion of the raised portion 78 is located on the side thereof generally adjacent the operator so that the operator's hand can rest thereon in the most normal and relaxed condition.

A rotary shaft 84 is disposed in the handrest 76 on the side thereof adjacent the operator and extends therein along a path generally parallel the angle of inclination of the raised portion 78. The rotary shaft 84 is rotatably secured to the control console assembly 76 so that it can be rotated in a clockwise or counter clockwise direction. A knob 86 is secured to the end of the rotary shaft 84 adjacent the end thereof adjacent the operator. A pair of depressions 88,90 are defined on the knob 86, each being spaced from the other. The pair of depressions 88,90 are oriented on the knob 86 so that the thumb of the operator's hand can easily be located within each of the pair of depressions to rotate the rotary shaft 84 in the clockwise or counter clockwise direction.

An electrical switch, such as a three-position electrical switch 92, is mounted on the control console assembly 66 and operatively connected to the rotary shaft 84 by a mechanical linkage 93 and operative to deliver an electrical signal therefrom in response to clockwise or counter clockwise rotation of the rotary shaft 84. The electrical signal from the three-position electrical switch 92 is delivered to the microprocessor 36 by an electrical connection 94.

A pair of electrical push button switches 96,98 are mounted on the knob 86 adjacent the pair of depressions 88,90 so that the operator's thumb can easily depress either of the pair of electrical push buttons switches 96,98. An electrical signal is transmitted from the respective ones of the pair of electrical push button switches 96,98 to the microprocessor 36 by electrical connections 100,102.

An electrical actuator switch 104 is located on the side of the control console assembly 66 adjacent the operator and operative to readily allow the operator to raise or lower the control console assembly 66 relative to the frame 64.

A pair of levers 106,108 is pivotally mounted on the control console assembly 66 adjacent the handrest 76 and oriented on the side thereof opposite the armrest 70 and positioned such that the operator's fingertips are accessible thereto.

A pair of rotary sensors 112,114 are mounted on the control console assembly 66 and are operative to deliver electrical signals in response to rotary input thereto. The electrical signals delivered therefrom are delivered to the microprocessor 36 through electrical connections 116,118.

A pair of linkage mechanism 120,122 are operative to connect the respective ones of the pair of levers 106,108 to respective ones of the pair of rotary sensors 112,114. Even though, in the arrangement illustrated, the pair of linkage mechanisms 120,122 is utilized to interconnect the pair of levers 106,108 to the respective pair of rotary sensors 112,114, it is recognized that the pair of levers 106,108 could be connected directly to the respective ones of the pair of rotary sensors 112,114 without departing from the essence of the invention. A pair of tension springs 124,126 is connected to respective ones of the pair of linkage mechanisms 120,122 and operative to provide extra force to movement of the respective ones of the pair of levers 106,108 once each has been moved through approximately one half of its travel distance.

It is recognized that a rotary sensor could be utilized to replace the three-position electrical switch 92 without departing from the essence of the invention. Furthermore, even though the earthworking vehicle described herein is for the control of a transmission and steering clutches and brakes, it is recognized that various forms of the vehicle control mechanism could be utilized to control various other combinations of vehicle operating functions, such as, bulldozer blades, ripper assemblies, operating functions of loaders, operating functions of excavators, etc.

Industrial Applicability

During operation of the earthworking vehicle described herein, the operator rests his forearm on the armrest 70 and the palm of his hand on the handrest 76. It is recognized, that the operator may elect not to place his forearm on the armrest 70 and only rest the palm of his hand on the handrest 76. In either situation, the heal of the operator's hand is in constant, intimate contact with the raised portion 78 of the handrest 76. Even though the operator is being jostled about due to the earthworking vehicle traversing rough terrain, the operator's hand remains in intimate contact with the raised portion 78 of the handrest 76.

In order to shift the multi-speed transmission 12 into a forward direction, the operator places his thumb in one of the pair of depressions 88,90 and rotates the knob 86 and, consequently, the rotary shaft 84 in a clockwise direction. The clockwise movement of the knob 86 moves the three-position electrical switch 92 to one of its operative positions thus directing an electrical signal through the electrical connection 100 to the microprocessor 36. Upon receipt of the input signal from the three-position electrical switch 92, the microprocessor 36 delivers a signal through the electrical connection 46 to the forward clutch 16 of the multi-speed transmission 12. This electrical signal activates the forward clutch 16 resulting in the earthworking vehicle moving in a forward direction. To increase the ground speed of the earthworking vehicle, the operator depresses one of the pair of electrical push button switches 96,98 which delivers an electrical signal to the microprocessor 36 through the electrical connection 100. Upon receipt of the input signal the electrical connection 100, the microprocessor 36 the microprocessor 36 terminates the electrical signal to the speed clutch 20 and simultaneously delivers another electrical signal through the electrical connection 52 to the speed clutch 22 thus changing the speed of the transmission to a second higher speed. Likewise, by depressing the one of the pair of electrical push button switches 96,98 again, the multi-speed transmission 12 is shifted from the second higher speed to yet a third higher speed. The extra pressing of the one of the pair of electrical push buttons switches 96,98 directs the input signal through the electrical connection 100 to the microprocessor 36. Upon receipt of the electrical signal produced by depression of the one of the pair of electrical push button switches 96,98, the microprocessor 36 terminates the electrical signal to the speed clutch 22 and transmit an electrical signal through the conduit 54 to the third speed clutch 34 thus changing the multi-speed transmission 12 to its third operating speed.

If the operator desires to change the speed of the multi-speed transmission 12 from its third operating speed back to the second operating speed, the operator merely depresses the other one of the pair of electrical push button switches 96,98 to send an electrical signal to the microprocessor 36 which, in turn, terminate the electrical signal to the speed clutch 24 and transmits an electrical signal to activate the speed clutch 22 thus changing the multi-speed transmission 12 from its third operating speed to its second operating speed. By depressing the other one of the pair of electrical push button switches 96,98 again, the multi-speed transmission 12 changes from its second operating speed to its first operating speed in a similar manner by the microprocessor 36 terminating the electrical signal to the speed clutch 22 and transmitting an electrical signal to the speed clutch 20.

In order to change the vehicle from a forward travel direction to a reverse travel direction, the operator places his thumb in the other one of the pair of depression 88,90 and rotates the knob 86 in a counter clockwise direction. The counter clockwise movement of the knob 86 moves the three-position electrical switch 92 from its first operative position back to its neutral position and progressively to its other operative position. In the other operative position of the three-position electrical switch 92, an electrical signal is directed through the electrical connection 94 to the microprocessor 36 which in turn terminates the electrical signal to the forward clutch 16 and transmits an electrical signal to activate the reverse clutch 18. As previously set forth with respect to the forward direction, the reverse speed of the multi-speed transmission 12 is increased by the operator depressing the one of the pair of electrical push button switches 96,98 thus increasing the reverse travel speed. Likewise, the reverse speed of the earthworking vehicle can be reduced by the operator depressing the other one of the pair of electrical push button switches 96,98.

During the shifting of the multi-speed transmission 12 between its forward and reverse directions of travel and the various speed ratios, the operator's hand never leaves contact with the raise portion of the handrest 76.

In order to steer or change the angle of travel direction, the operator merely uses his fingertips to move respective ones of the pair of levers 106,108. For a minor change in the angle of travel direction, the operator uses the tip of one of his fingers to move one of the pair of levers 106,108 towards the handrest 76. Movement of the one of the pair of levers 106,108 towards the handrest 76 simultaneously rotates one of the pair of rotary sensors 112,114. During rotary motion of the one of the pair of rotary sensors 112,114, an electrical signal is transmitted through electrical connection 116 to the microprocessor 36. As is well known, the energy of the electrical signal increases or decreases with each increment of rotation of the respective rotary sensor 112,114. The microprocessor 36 transmits an electrical signal through the electrical connection 38 to the electrically controlled proportional valve 34 of the steer clutch 26 to cause the steer clutch 26 to slip. This allows the earthworking vehicle to change its angle of travel in a conventional manner, as is well known in the art. For every increment of movement of the one of the pair of levers 106,108 towards the handrest 76, the steer clutch 26 is progressively disengaged to provide a greater angle of change to the vehicle travel direction.

Once the one of the pair of levers 106,108 has been moved by the operator's fingertip approximately half way through its travel path, the steer clutch 26 is fully disengaged. Further movement of the one of the pair of levers 106,108 towards the handrest 76 continues to change the electrical signal being transmitted to the microprocessor 36. The further movement of the one of the pair of levers 106,108 is detected by the operator since the respective one of the pair of tension springs 124,126 adds additional force to movement of the one of the pair of levers 106,108.

The microprocessor 36 reacting to the continued increase in the electrical signal from the one of the pair of rotary sensors 112,114 maintains the steer clutch 26 in its fully released condition and transmits a signal through electrical connection 40 to the electrically controlled proportion valve 34 of the steer brake 30. This signal progressively applies the steer brake 30 resulting in a more rapid change in the angle of travel of the earthworking vehicle. Once the one of the pair of levers 106,108 is moved to its extreme position by the operator's fingertip, the steer brake 30 is fully applied and the rotational output on the one side of the earthworking vehicle is stopped.

During the movement of the one of the pair levers 106,108, the heel of the operator's hand remains in intimate contact with the raised portion 78 of the handrest 76 thus providing more finite control of the one of the pair of levers 106,108. This remains true even though the operator is being jostled around on the seat due to the earthworking vehicle traversing rough terrain. In order to change the angle of travel of the earthworking vehicle to a different direction, the operator merely uses the tip of one of his fingers to progressively move the other of the pair of levers 106,108 towards the handrest 76 as set forth above with respect to movement of the one of the pair of levers 106,108. During movement of the other lever of the pair of levers 106,108, an electrical signal is transmitted from the other of the pair of rotary sensors 112,114 through the electrical connection 118 to the microprocessor 36. Upon receipt of the input signal from the other of the pair of rotary sensors 112,114, the microprocessor 36 transmits an electrical signal through the electrical connection 44 to the electrically controlled proportional valve 34 of the steer clutch 28. This electrical signal progressively disengages the steer clutch 28 responsive to the degree of movement of the other of the pair of levers 106,108. Once the other of the pair of levers 106,108 is moved through approximately half of its range of travel, the steer clutch 28 is fully disengaged. Further movement of the other of the pair of levers 106,108 towards the handrest 76 results in the microprocessor maintaining the steer clutch 28 fully disengaged and transmitting an electrical signal through the electrical line 42 to the other steer brake 32. As noted above, this electrical signal progressively engages the other steer brake 32 in proportion to the degree of movement of the other lever 108. As previously noted with respect to movement of the one of the pair of levers 106,108, further movement of the other of the pair of levers 106,108 is resisted by the other of the pair of tension springs 124,126. This added force indicates to the operator that the other steer clutch 28 is disengaged and engagement of the other steer brake 32 is beginning. Once the other of the pair of levers 106,108 is moved to its extreme position, the other brake 32 is fully engaged and the earthworking vehicle is pivot turning in the direction opposite to that previously set forth.

In order to orient the armrest 70 and the handrest 76 to a position most comfortable for the operator, the operator presses the electrical actuator switch 104 to either raise or lower the control console 66 relative to the frame 64. Once the armrest 70 and the handrest 76 are in the position desired, the operator merely releases the electrical actuator switch 104 and the control console assembly 66 remains in the desired position.

Since the heel of the operator's hand is in intimate contact with the raised portion 78 of the handrest 76 and the fingers of the operator are controlling the various vehicle operating functions without having to move his hand, a more precise and smooth control of the vehicle can be maintained. This is generally attributed to the fact that, in use, the hand of the operator remains in a generally constant position with respect to the pair of levers 106,108, the knob 86, and the pair of electrical push button switches 96,98. Therefore, the operator can readily move the pair of levers 106,108 and the rotary shaft 84 or depress either of the electrical push button switches 96,98 without having to move the heel of his hand relative to the raised portion 78. This occurs even though he is being jostled about in the seat 10 by movement of the earthworking vehicle along a rough terrain.

Other aspects, objects, and advantages of this invention can be obtained from a study of the drawings, the disclosure, and the appended claims.

We claim:

1. A vehicle control mechanism for use by an operator to control an earthworking vehicle having multiple operating functions, the vehicle control mechanism comprising:

a control console assembly oriented, in use, adjacent one side of the operator and having a handrest connected thereto, the handrest having a top surface and a horizontal plane defined along the top surface and a raised portion adapted, in use, for the operator to rest the palm of his hand and to provide firm support for the heel of his hand, the raised portion of the handrest being inclined with respect to the horizontal plane at an angle in the range of five to nine degrees;

a pair of levers pivotally mounted on the control console assembly and located adjacent the handrest and each of the levers being movable, in use, by any one of the operator's fingertips; and a pair of rotary sensors mounted on the control console assembly and each being operative, in use, to deliver an electrical signal therefrom that is operative to control one of the vehicle's operating functions in response to rotation thereof, each of the rotary sensors being connected to respective ones of the pair of levers and operative to rotate in response to movement of the respective ones of the pair of levers connected thereto.

2. The vehicle control mechanism of claim 1 wherein the raised portion of the handrest is inclined at an angle of seven degrees.

3. The vehicle control mechanism of claim 1 wherein a rotary shaft is rotatably disposed in the raised portion of the handrest extending inwardly from the side thereof adjacent the operator parallel to the angle of inclination, a knob is secured to the rotary shaft at the end thereof adjacent the operator, a pair of depressions is defined on the knob in spaced apart relationship and oriented in a position such that, in use, the operator's thumb can easily be positioned in either one of the pair the depressions for clockwise or counterclockwise rotation of the knob, an electrical switch is operatively connected to the rotary shaft to deliver an electrical signal therefrom to control another of the vehicle's operating function in response to rotation of the rotary shaft.

4. The vehicle control mechanism of claim 3 including a pair of electrical push button switches mounted in the end of the knob generally adjacent the pair of depressions and operative, in use, when depressed to control additional operating functions of the earthworking vehicle.

5. The vehicle control mechanism of claim 4 wherein the vehicle control mechanism includes a frame member adapted for connection to the earthworking vehicle, an armrest located adjacent to and behind the handrest, and the control console assembly that is adjustably connected to the frame member, an electrically controlled actuator is connected between the frame member and the control console assembly and operative to raise or lower the control console assembly so that the armrest and the handrest thereon can be moved, in use, to a position most comfortable for the operator, and an electrical actuator switch is mounted on the control console assembly adjacent the handrest so that the operator can easily control the electrical actuator switch to raise or lower the control console assembly.

6. The vehicle control mechanism of claim 1 including a pair of linkage mechanisms each interconnecting respective ones of the pair of levers to the respective ones of the pair of rotary sensors.

7. A vehicle control mechanism in combination with an earthworking vehicle having a reversible multi-speed transmission for propelling the earthworking vehicle in forward and reverse directions at different speed ratios and a steering control mechanism having steering clutches and brakes for controlling the angle of travel of the earthworking vehicle, the combination comprising:

the steering control mechanism having electrically controlled proportional valves operative to progressively release the respective steer clutches and to progressively apply the respective steer brakes in response to receipt of an electrical signal;

the multi-speed transmission having multiple clutches which are selectively engaged in response to an electrical signal to control both travel direction and speed of travel of the earthworking vehicle;

a microprocessor connected to the steering mechanism and the multi-speed transmission and operative to provide the various electrical signals needed to control the steering mechanism and the multi-speed transmission; and a control console assembly oriented, in use, adjacent one side of an operator and having a handrest located thereon, the handrest having a raised portion operative, in use, for the operator to have a firm support for the heel of his hand, a pair of levers pivotally mounted on the control console assembly adjacent the handrest, each one of the pair of levers being operatively connected to respective ones of a pair of rotary sensors, each one of the pair of rotary sensors being operatively connected to the microprocessor to provide a signal thereto responsive to movement of the respective ones of the pair of levers, and a rotary shaft rotatably disposed in the raised portion of the handrest adjacent the operator and has a knob located on one end thereof and oriented, in use, so that when the operator's hand is on the handrest his thumb is in easy engagement with the knob, a pair of spaced apart depressions is defined on the knob and operative, in use, to receive the thumb of the operator for causing rotation thereof, an electrical switch is operatively connected to the rotary shaft to produce an electrical signal in response to clockwise and counterclockwise rotation of the rotary shaft, the produced electrical signal is transmitted to the microprocessor which produces an electrical signal to control the respective forward and reverse clutches.

8. The combination of claim 7 wherein movement of one of the pair of levers is operative to progressively release the steer clutch on one side of the earthworking vehicle to change the angle of travel and further movement of the one of the pair of levers maintains the steer clutch released and progressively applies the steer brake on the one side thereof to more quickly change the angle of travel direction, movement of the one of the pair of levers to its initial position returns the earthworking vehicle to a straight line travel, movement of the other of the pair of levers steers the earthworking vehicle in the other direction by progressively releasing the steer clutch on the other side thereof and continued movement of the other of the pair of levers progressively applies the steer brake on the other side.

9. The combination of claim 8 including a pair of electrical push button switches mounted on the end of the knob adjacent the pair of spaced apart depressions and operative, in use, when depressed to provide an electrical signal to the microprocessor for changing the speed ratio of the multi-speed transmission.

10. The combination of claim 9 wherein the vehicle control mechanism includes a frame member connected to the earthworking vehicle and the control console assembly having an armrest located thereon, the control console assembly is slidably connected to the frame member and selectively movable to adjust the position of the armrest and the handrest for the operator's comfort.

* * * * *